US008840061B2

(12) United States Patent
Caruel et al.

(10) Patent No.: US 8,840,061 B2
(45) Date of Patent: Sep. 23, 2014

(54) STRUT DESIGNED TO SUPPORT AN AIRCRAFT TURBOJET ENGINE, AND NACELLE COMPRISING SUCH A STRUT

(75) Inventors: Pierre Caruel, Le Havre (FR); Guy Bernard Vauchel, Harfleur (FR)

(73) Assignee: Aircelle, Gonfreville l'Orcher (FR)

( * ) Notice: Subject to any disclaimer, the term of this patent is extended or adjusted under 35 U.S.C. 154(b) by 92 days.

(21) Appl. No.: 13/121,470

(22) PCT Filed: Aug. 5, 2009

(86) PCT No.: PCT/FR2009/000981
§ 371 (c)(1),
(2), (4) Date: Mar. 29, 2011

(87) PCT Pub. No.: WO2010/037917
PCT Pub. Date: Apr. 8, 2010

(65) Prior Publication Data
US 2011/0174919 A1  Jul. 21, 2011

(30) Foreign Application Priority Data

Oct. 1, 2008  (FR) ..................................... 08 05420
Mar. 9, 2009  (FR) ..................................... 09 01071

(51) Int. Cl.
B64B 1/28 (2006.01)
B64D 27/00 (2006.01)
F16M 1/00 (2006.01)
F02C 7/20 (2006.01)
B64D 27/26 (2006.01)
B64D 29/08 (2006.01)

(52) U.S. Cl.
CPC .............. *B64D 27/26* (2013.01); *Y02T 50/672* (2013.01); *Y02T 50/44* (2013.01); *F05D 2250/70* (2013.01); *F05D 2260/50* (2013.01); *B64D 29/08* (2013.01); *F02C 7/20* (2013.01)
USPC ............. 244/54; 244/53 R; 60/226.2; 60/796; 248/554

(58) Field of Classification Search
USPC ..... 244/54, 53 R, 110 B, 129.4; 60/796, 797, 60/798, 226.2; 248/554
See application file for complete search history.

(56) References Cited

U.S. PATENT DOCUMENTS 4,044,973 A * 8/1977 Moorehead ...................... 244/54
4,922,713 A * 5/1990 Barbarin et al. ............. 60/226.2
(Continued)

FOREIGN PATENT DOCUMENTS

FR  2732947 A1  10/1996
FR  2873987 A1  2/2006
(Continued)

OTHER PUBLICATIONS

International Search Report PCT/FR2009/000981; Dated Jan. 14, 2010.

*Primary Examiner* — Tien Dinh
*Assistant Examiner* — Michael Wang
(74) *Attorney, Agent, or Firm* — Brinks Gilson & Lione

(57) ABSTRACT

This strut (9), designed to support an aircraft turbojet engine, has, on the one hand, a connecting part (11) for connection between the casing (1) of the fan (3) or the casing of the gas generator (5) of the said turbojet engine and a wing of the said aircraft and, on the other hand, a Y-shaped box-section part (19), secured to the said connecting part (11) and designed to form the upper part of the inner fixed structure of the said nacelle.

17 Claims, 6 Drawing Sheets

(56) References Cited

U.S. PATENT DOCUMENTS

| | | | |
|---|---|---|---|
| 5,524,847 A * | 6/1996 | Brodell et al. | 244/54 |
| 6,209,822 B1 * | 4/2001 | Le Blaye | 244/54 |
| 6,233,920 B1 * | 5/2001 | Presz et al. | 60/230 |
| 8,070,093 B2 * | 12/2011 | Diochon et al. | 244/54 |
| 8,256,707 B2 * | 9/2012 | Suciu et al. | 244/54 |
| 8,646,724 B2 * | 2/2014 | Bonnet et al. | 244/54 |

FOREIGN PATENT DOCUMENTS

| | | |
|---|---|---|
| FR | 2891526 A1 | 4/2007 |
| WO | 2008043903 A2 | 4/2008 |

* cited by examiner

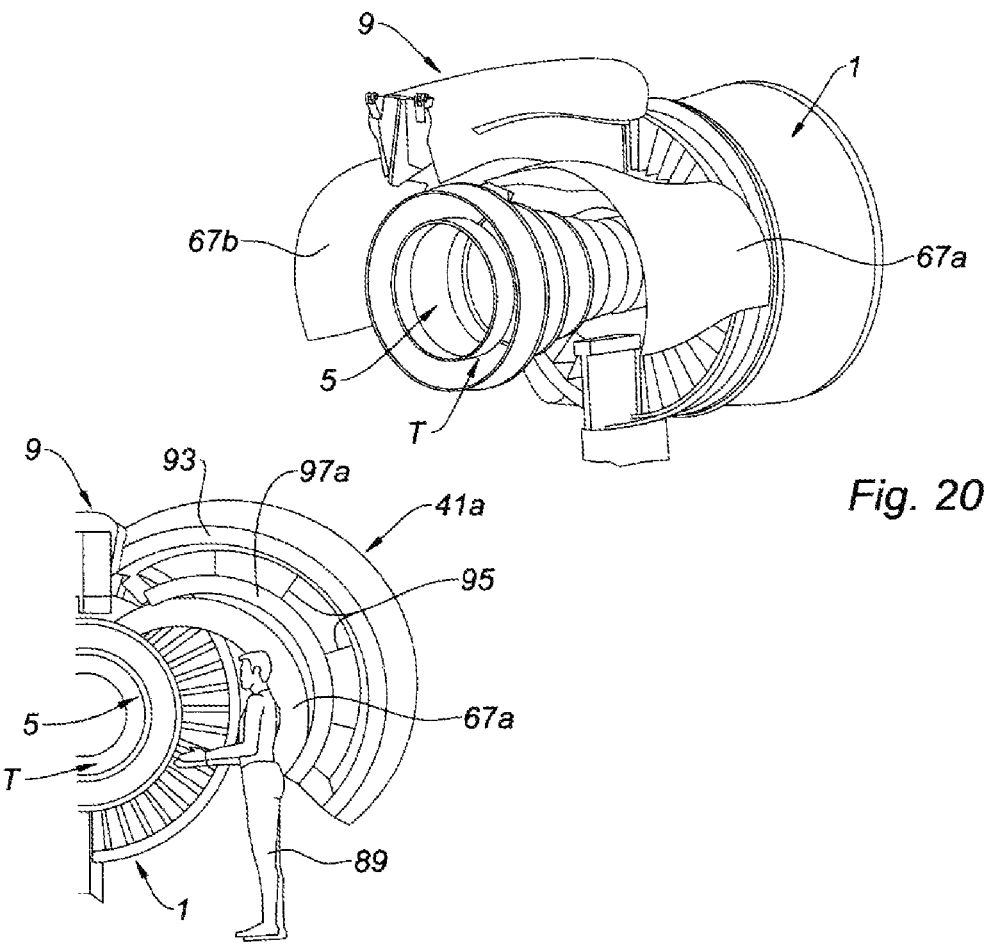
Fig. 20
Fig. 21
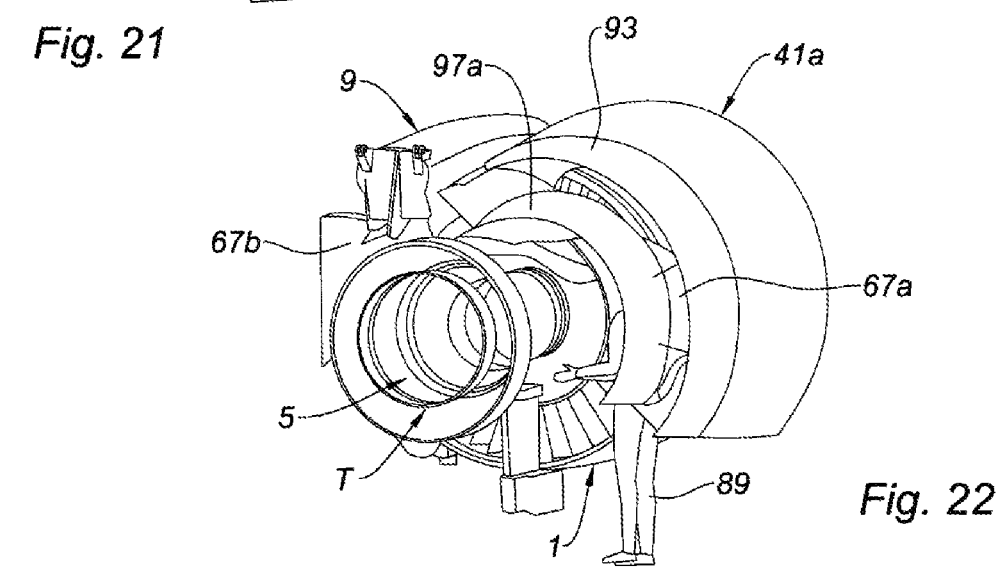
Fig. 22

STRUT DESIGNED TO SUPPORT AN AIRCRAFT TURBOJET ENGINE, AND NACELLE COMPRISING SUCH A STRUT

TECHNICAL FIELD

The present invention relates to a strut adapted to support an aircraft turbojet engine, and a nacelle associated with such a strut.

BACKGROUND

As already known from the prior art, an aircraft turbojet engine is housed inside a nacelle and connected to a strut making it possible to suspend the propulsion assembly thus formed under an aircraft wing.

Thrust recovery connecting rods are inserted between the strut and the turbojet engine, so as to recover the efforts created by the thrust of the engine.

In the propulsion assemblies according to the prior art, these connecting rods are subjected to very high temperatures created in particular by the combustion chamber of the engine, which requires the use of particular steel alloys, the weight of which is substantial.

BRIEF SUMMARY

The present invention aims in particular to provide means making it possible to use lighter materials for the thrust recovery connecting rods.

This aim of the invention is achieved with a strut adapted to support an aircraft turbojet engine nacelle, having on one hand a connecting part for connection between the casing of the fan or the casing of the gas generator of said turbojet engine and a wing of said aircraft, and on the other hand a Y-shaped box-section part, secured to said connecting part and adapted to form the upper part of the internal fixed structure of said nacelle.

Due to its box-section part, such a strut is able to surround the thrust recovery connecting rods, and thereby protect them from the radiation and the convection of the heat given off by the engine: these connecting rods can therefore be made from less heat-resistant and lighter materials, such as titanium, aluminum, or composite materials.

It should be noted that this protection from the heat given off by the engine also makes it possible to make part of the strut from composite materials, and therefore to further reduce the weight of the assembly.

The box-section shape of the strut also makes it possible to maximize the torsional inertia of said strut, and therefore an optimal recovery of the momentum created by the engine: in this way it is possible to reduce the dimensions of the rear fastener of the engine that normally recovers that momentum, which contributes to reducing the weight and the butt of the strut, reducing the size of the structure necessary for its fairing, resulting in aerodynamic drag gains.

It should also be noted that the fact that the box-section part of the strut is configured to replace the upper portion of the internal fixed structure of the nacelle, makes it possible to do away with the production complexity of that part, complexity related to the fact that that part has a curve opposite that of the rest of the fixed structure.

According to optional features of the strut according to the invention:

said box-structure part comprises ventilation orifices: these orifices make it possible to cool the thrust recovery connecting rods located inside the box-section part in order to offset the heat given off by the engine;

said connecting part comprises a cross-piece supporting connecting cones with said casing of the fan;

said box-section part includes connecting platens for connection to said gas generator.

The present invention also relates to an aircraft turbojet engine nacelle incorporating a strut according to the preceding in the downstream portion thereof, in which the connecting part of the strut is adapted to be fixed on said casing of the fan or on said casing of the gas generator, and thrust recovery connecting rods extending to the inside of the box-section part of said strut to cooperate with said casing of the gas generator.

According to optional features of this nacelle according to the invention:

said aircraft turbojet engine nacelle incorporates a strut according to the preceding in its downstream portion, and does not have thrust recovery connecting rods inside said box-section part, the engine thrust being recovered directly by the box-section structure;

said downstream portion includes a grid thrust reverser: such a reverser, very commonly used, makes it possible to reduce the aircraft's braking distance;

said reverser comprises a grid support structure comprising two upper halves fixed on said fan casing and connected to each other by connecting rods passing through the connecting part of said strut: these connecting rods make it possible to impart the necessary stiffness to the assembly, and to pick up the hoop load;

said grid support structure also comprises two lower halves pivotably mounted on said upper halves between a service position and a maintenance position: these two pivoting lower halves allow easy access to the engine for maintenance operations;

said lower halves incorporate upstream panels defining the upstream lower part of the internal fixed structure of the nacelle, as a complement to said box-section part: the incorporation of these upstream panels with the lower halves of the grid support structure makes it possible to open these panels at the same time as these lower halves, which limits the number of operations necessary to access the engine;

said nacelle also comprises a quasi-circular panel defining the downstream lower part of the internal fixed structure of the nacelle, this panel being slidingly mounted on said box-section part between a service position in which it adjoins said upstream panels, and a maintenance position in which it is spaced away downstream from said upstream panels; this sliding panel enables an optimal release of the engine for maintenance operations;

said nacelle comprises a cowl slidingly mounted on the connecting part of said strut between a direct jet position, in which said cowl covers said grids, and a reversed jet position, in which this cowl uncovers said grids;

said cowl comprises two upper halves slidingly mounted on the connecting part of said strut, cooperating with at least two upper actuators, and a lower part slidingly mounted on said upper halves between an upstream service position and a downstream maintenance position: this embodiment of the cowl makes it possible to slide the lower part downstream of the upper halves when the latter are in the reversed jet position, which facilitates access to the engine for maintenance operations;

said nacelle comprises a lower actuator cooperating with said lower cowl part: in this particular embodiment, it is necessary to disconnect the lower actuator from the lower cowl part before making the latter slide for maintenance operations;

said nacelle comprises a frame connecting said two upper halves of the cowl to each other, and a lower actuator cooperating with said frame: in this embodiment, it is not necessary to disconnect the lower actuator from the lower cowl part before making the latter slide for maintenance operations;

said nacelle comprises a thrust reverser with doors comprising two half-panels defining the internal fixed structure of the nacelle, these two half-panels being able to move between a service position and a maintenance position using a system of connecting rods and guideways;

said nacelle is of the S-shaped secondary flow stream type, and comprises two internal structure half-panels articulated on said strut and two mobile half-cowls slidingly mounted on rails themselves pivotably mounted on said strut;

said nacelle comprises two half-panels and two half-rings defining the internal fixed structure of the nacelle, and two mobile half-cowls provided with thrust reverser cover doors on their trailing edges, connected by connecting rods to said half-rings, said half-panels being articulated on said strut, and the assemblies formed by said mobile half-cowls and by said half-rings being slidingly mounted on rails, themselves pivotably mounted on said strut.

The present invention also relates to a propulsion assembly comprising a nacelle according to the preceding, and a turbojet engine housed inside that nacelle and cooperating with said strut.

BRIEF DESCRIPTION OF THE DRAWINGS

Other features and advantages of the present invention will appear in light of the following description, and upon examining the appended figures, in which:

FIG. 20 is a perspective view of the assembly of FIG. 18, the mobile cowl and the downstream part of the internal fixed structure of the nacelle having been removed for explanatory purposes, and the two upstream halves of the internal fixed structure being shown in the open maintenance position, and FIGS. 21 and 22 are back and perspective views, respectively, of the propulsion assembly of FIGS. 18 to 20, half of the thrust reverser being shown in the maintenance position, with an operator in the process of working on the turbojet engine.

DETAILED DESCRIPTION

Figure 1:
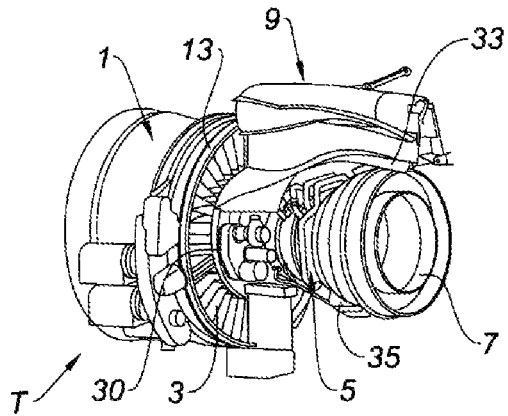
FIG. 1 shows, in perspective, an aircraft turbojet engine suspended from a strut according to the invention.

FIG. 1 shows an aircraft turbojet engine T typically including, from upstream to downstream relative to the direction of air flow, a fan casing 1, a fan 3, a gas generator 5, and a hot gas exhaust casing 7.

A strut 9 according to the invention is fixed on this gas generator in several places, as will now be explained.

Figure 2:
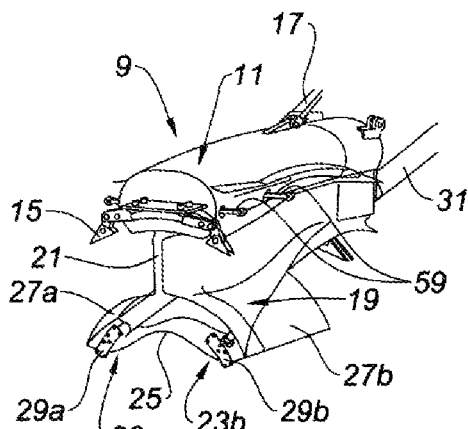
FIG. 2 shows a perspective view from another angle of the strut of FIG. 1.

As shown in FIG. 2, this strut 9 includes an upper part 11 (i.e. intended to be positioned above the gas generator during operation) making it possible to make the connection between the downstream edge 13 of the fan casing 1 (or the casing of the gas generator 5) and an aircraft wing (not shown).

In order to perform this connecting function, this part 11 includes, upstream, fittings 15 intended to be fixed on the downstream edge 13 of the casing 1 (in the case of front suspension connected to the fan casing).

This connecting part 11 extends, in its lower zone, by a box-section part 19 substantially having the shape of an inverted "Y."

Specifically, as shown in FIG. 2, the central part 21 of the Y extends under the connecting part 11, and said central part 21 splits into two parts 23a, 23b, defining the two branches of the "Y."

These two parts 23a, 23b define a box-section, i.e. a hollow part comprising a lower central wall 25 and two upper lateral walls 27a, 27b.

The upstream part of the box-section 19 is intended to cooperate with the upstream part of the gas generator 5.

More precisely, and as shown in FIG. 2, thrust recovery connecting rods 29a, 29b extending inside the box-section 19, are fixed on the upstream part of the gas generator 5.

In their downstream part, hidden in FIG. 2, these connecting rods are typically connected to a central thrust recovery pedal 31, itself intended to be connected to the reactor strut fixed under the wing of the aircraft.

As shown in FIG. 1, the downstream part of the strut 9 is fixed to the rear 33 of the gas generator 5 via a traditional rear suspension.

When the engine is suspended from the strut 9, the two lateral parts 23a, 23b of the box-section 19 form part of the internal fixed structure (IFS) of the nacelle, fairing the gas generator 5 and the members 35 fixed to its periphery.

Figure 3:
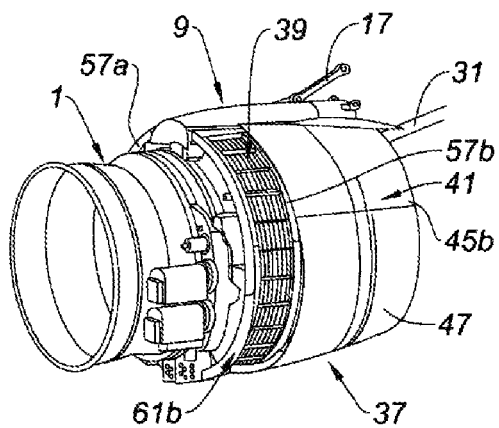
FIG. 3 shows the assembly of FIG. 1 equipped with its grid thrust reverser, the latter being in the "reversed jet" position.

FIG. 3 shows the assembly of FIG. 1 in which a grid thrust reverser system 37 has been added, forming the downstream part of the nacelle surrounding the turbojet engine T (the upstream part of this nacelle comprising an air inlet, and the intermediate part of this nacelle comprising fairings surrounding the fan casing 1 not having been shown in the attached figures).

As is known in itself, the grid thrust reverser system 37 comprises a fixed grid support structure 39, and a sliding cowl 41, slidingly mounted on the strut 9 between a so-called "direct jet" position in which it covers the structure 39, and a so-called "reversed jet" position, shown in FIG. 3, in which this cowl uncovers the structure 39.

Figure 6:
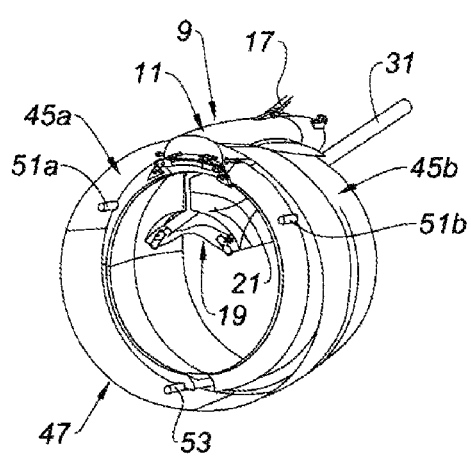
FIG. 6 is a perspective view of the assembly formed by the strut of FIG. 2 and the thrust reverser cowl, the other members (engine and grid support) having been removed.
Figure 7:
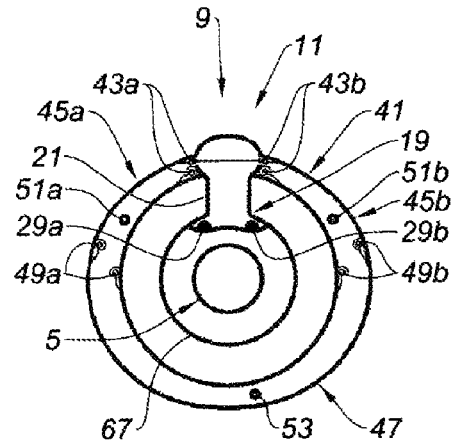
FIG. 7 is a diagrammatic transverse cross-sectional view of the assembly formed by the strut, the thrust reverser cowl, the engine, and an internal fixed structure.

More precisely, as shown in FIGS. 6 and 7, the sliding cowl 41 is slidingly mounted on the strut 9 via suitable rails 43a, 43b.

Preferably, as shown in FIGS. 6 and 7, this sliding cowl 41 includes two upper halves 45a, 45b, each slidingly mounted on the strut 9, and a lower part 47 slidingly mounted on the upper halves 45a, 45b via suitable rails 49a, 49b.

At least two upper actuators 51a, 51b, connected to the grid support structure 39, make it possible to actuate the upper cowl halves 45a, 45b between the "direct jet" position and the "reversed jet" position.

A lower actuator 53, connected to the downstream edge 13 of the fan casing 1, makes it possible to act on the lower part 47 of the cowl 41.

It should be noted that in a service situation, i.e. in a normal operating situation, the lower part of the cowl 47 is locked to the upper two halves 45a, 45b.

Figure 4:
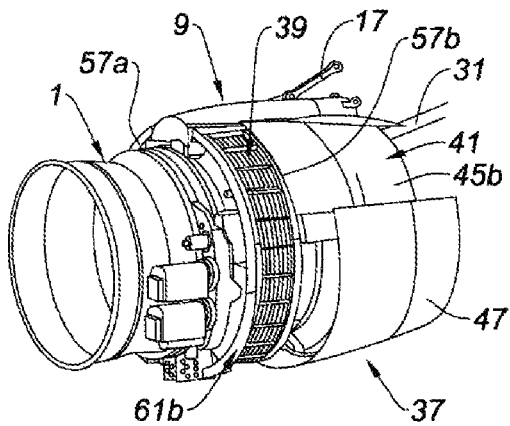
FIG. 4 shows the assembly of FIG. 3 in which the lower part of the thrust reverser cowl has been slid towards a maintenance position.
Figure 5:
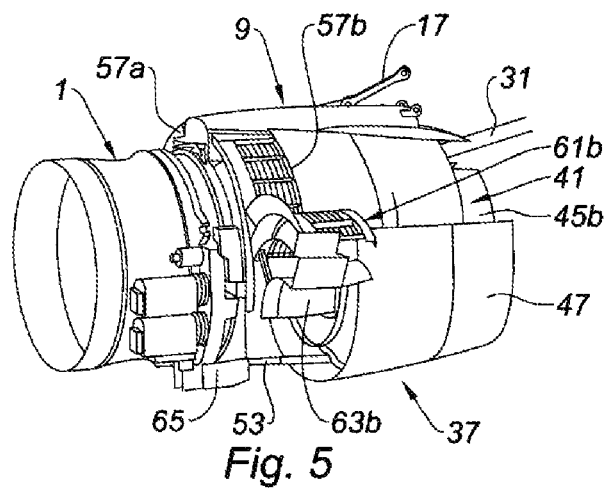
FIG. 5 shows the assembly of FIG. 4 in which the lower halves of the grid support structure have been opened towards a maintenance position.

In a maintenance situation, and as shown in FIGS. 4 and 5, the lower part 47 of the cowl 41 is unlocked from the two upper halves 45a, 45b, so as to be able to be slid downstream of these two upper halves towards a maintenance position allowing access to the gas generator 5.

It should be noted that this sliding of the lower part 47 of the cowl 41 assumes a disconnection of that lower part from the lower actuator 53.

Figure 8:
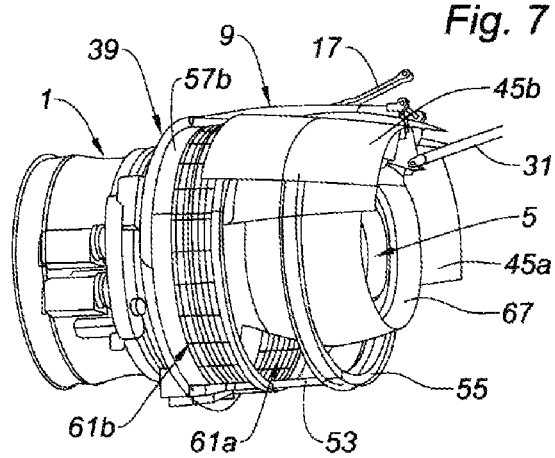
FIG. 8 is a perspective view of one particular embodiment of the propulsion assembly according to the invention, the lower part of the thrust reverser cowl having been removed.

Alternatively, as shown in FIG. 8, it is shown that a frame 55 can be provided connecting the two upper halves 45a, 45b to each other and cooperating with the lower actuator 53.

In this particular alternative, it is therefore not necessary to disconnect the lower part 47 from the mobile cowl to bring this lower part towards its maintenance position visible in FIG. 4.

We will now look more particularly at the grid support structure 39.

As shown in FIGS. 3, 4, 5, 8, 9 and 10, this support structure in fact includes two upper halves 57a, 57b, fixed to the downstream edge 13 of the fan casing 1, or possibly formed in a single piece with said fan casing.

These two upper halves are connected to each other by connecting rods 59, passing through the connecting part 11 of the strut 9, making it possible to stiffen the assembly thus obtained.

Pivotably mounted on these fixed upper halves 57a, 57b of the support structure 39 are respective lower halves 61a, 61b of the grid support structure 39.

Figure 10:
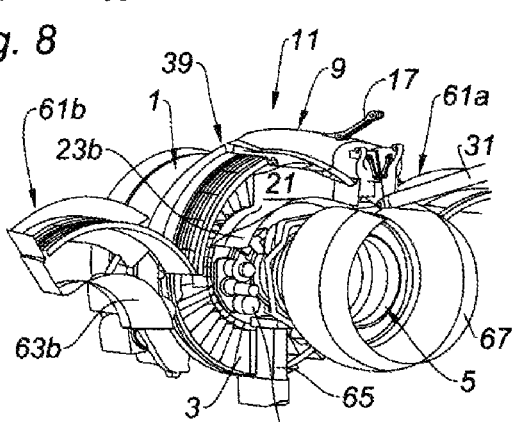
FIG. 10 is a view similar to that of FIG. 9, the lower halves of the grid support structure and the internal fixed structure being shown in the maintenance position.
Figure 11:
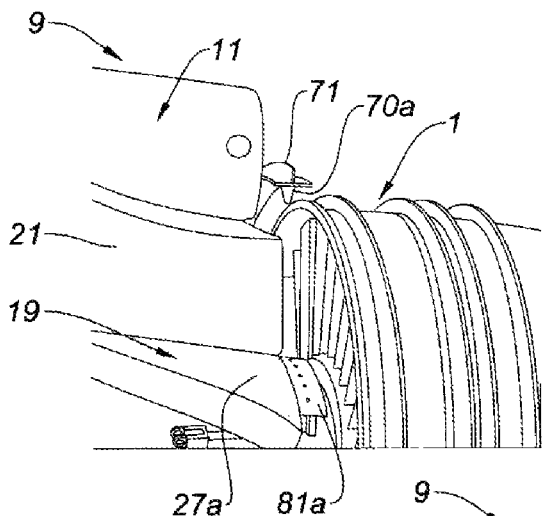
FIG. 11 is a detailed perspective view of one particular embodiment of the connection between the strut and the turbojet engine.
Figure 12:
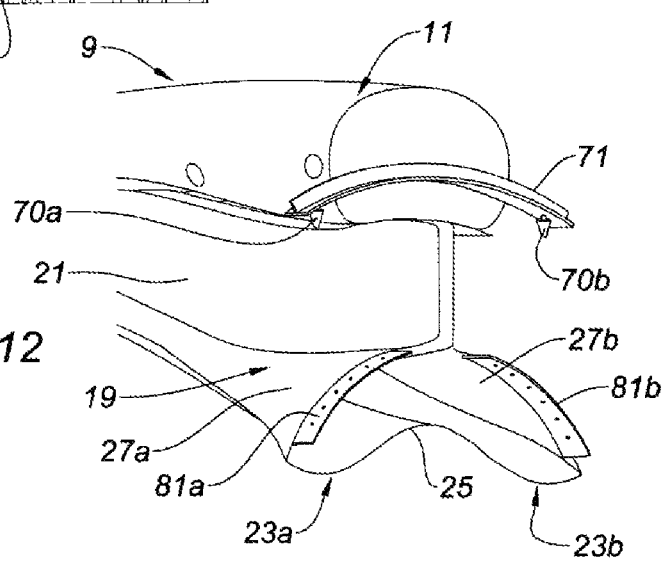
FIG. 12 is a perspective view, from another angle, of the strut of FIG. 11, FIGS. 13 and 14 are views similar to those of FIG. 12, indicating different possible implantations of connecting means for connecting the strut to the turbojet engine.

As shown particularly in FIGS. 5 and 10, each lower half 61a, 61b of the structure 39 incorporates an upstream panel 63a, 63b, positioned in the extension of the respective wall 27a, 27b of the box-section part 19, of the strut 9.

These upstream panels 63a, 63b therefore constitute, with the upper lateral walls 27a, 27b, the upstream part of the internal fixed structure (IFS) of the nacelle, surrounding the upstream part of the gas generator 5 and defining part of the circulation stream of fresh air coming from the fan 3.

Figure 9:
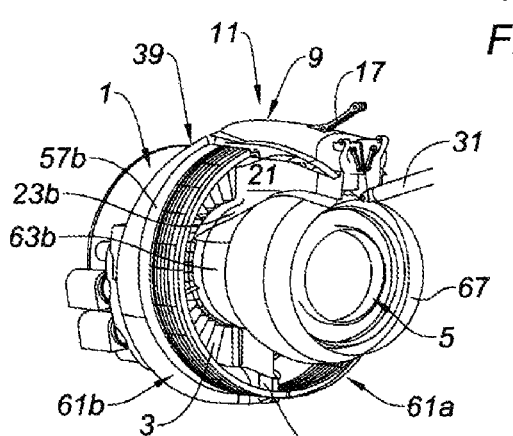
FIG. 9 is a perspective view of the back of the propulsion assembly according to the invention, the thrust reverser cowl having been removed.

As shown in FIGS. 9 and 10, the panels 63a, 63b are preferably faired to cover the lower arm 65 of the fan casing (as well as the arms situated at 4 o'clock and 8 o'clock, according to the terminology usually used to indicate the angular position of members on a nacelle—the strut 9 being at 12 o'clock and the lower arm 65 being at 6 o'clock).

Suitable locking means, not shown, are indeed provided to maintain the two lower halves 61a, 61b of the support structure 39 in their normal service position shown in FIG. 9.

We will now look more particularly at the downstream part of the internal fixed structure (IFS), and to that end we will refer more particularly to FIGS. 8 to 10.

As shown in these figures, this downstream part 67, situated in the extension of the upstream part formed on one hand by the two upper lateral walls 27a, 27b of the box-section part 19, and on the other hand by the two panels 63a, 63b, is itself formed by a quasi-annular panel found in the extension of the two lateral walls 27a, 27b.

This quasi-annular panel can be slidingly mounted on the box-section part 19 of the strut 9 between a normal service position, shown in FIGS. 8 and 9, in which this panel covers the members 35 situated on the periphery of the gas generator 5, and a maintenance position shown in FIG. 10, in which this panel 67 frees access to the members 35.

As one can therefore understand, when the lower part 47 of the cowl 41 has been placed in the maintenance position (FIG. 5), and when the two lower halves 61a, 61b of the grid support structure 39 are placed in the open position (FIG. 5) and when the panel 67 has been slid towards its downstream maintenance position (see FIG. 10), the access for an operator to the gas generator 5, and in particular the members 35 that surround it, is very easy.

When one wishes to completely take out the turbojet engine T for maintenance operations, the mobile cowl 41 is placed in the "reversed jet" position (FIG. 3), the lower part 47 of that mobile cowl is unlocked from the two upper halves 45a, 45b, the lower actuator 53 is separated from this lower part 47 of the mobile cowl, this lower part of the mobile cowl is taken out, the two lower halves 61a, 61b of the grid support structure 39 are opened (FIG. 10), the panel 67 is taken out, the thrust recovery connecting rods 29a, 29b are disconnected (FIG. 2), suitable hoisting means lift the turbojet engine T to ease the suspensions 15, 17 (see FIG. 2), the front and rear suspensions are disconnected, then the turbojet engine is taken out.

In the case where the two upper halves 45a, 45b of the cowl 41 are connected to each other by a frame 55 (see FIG. 8), it is necessary to provide for taking out these two upper halves 45a, 45b, to be able to take out the turbojet engine.

As can be understood in light of the preceding description, providing a box-section part 19 in the connecting strut 9 makes it possible to surround the thrust recovery connecting rods (29a, 29b) and thus to protect them from the high heats given off by the gas generator 5.

It is in particular possible to provide for protecting the lower central wall 25 of the box-section part 19 using a sheet of titanium or stainless steel so as to increase the thermal protection effect.

The box-section part 19 thus makes it possible to protect the thrust recovery connecting rods 29a, 29b from excessive heat, which makes it possible to make these connecting rods from lighter materials (titanium, aluminum or composite materials) than the steel alloys usually used.

It will also be noted that the box-section part 19 having a strong torsional inertia, makes it possible to optimally recover the momentum from the turbojet engine T around its axis: this in particular makes it possible to reduce the dimensions of the rear suspension point 33 (FIG. 1) of the turbojet jet engine T to the strut 9.

It will be noted that the thermal loop made up of the box-section part 19 advantageously makes it possible to consider making the upper part of the strut 9, and in particular the connecting part 11 and the central part 21, in materials that are less thermally resistive but lighter than the metal alloys usually used, such as composite materials.

Of course, the present invention is in no way limited to the embodiment described and illustrated, provided as a simple example.

FIGS. 11 to 15 thus illustrate another embodiment of the junction of the strut 9 to the turbojet engine T.

As visible in the figures, contrary to the preceding embodiment, there is no fastening fitting on the downstream edge 13 of the fan casing, or thrust recovery connecting rods fixed on the upstream part of the gas generator 5: these parts are respectively replaced by a pair of cones 70a, 70b secured to a curved cross-piece 71 itself fixed on the connecting part 11 of the strut 9, these cones cooperating with the fan casing 1 so as to allow assembly even in case of a slight misalignment of the strut relative to the turbojet engine, and by bolts 79 able to connect platens 81a, 81b secured to two upper lateral parts 27a, 27b of the box-section 19 of the strut 9, to the upstream part of the gas generator 5.

Figure 13:
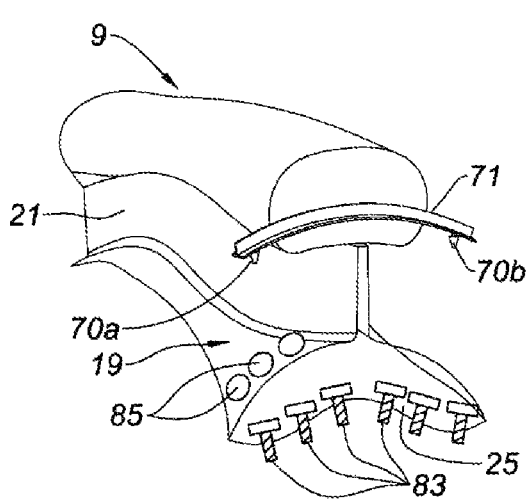
Figure 14:
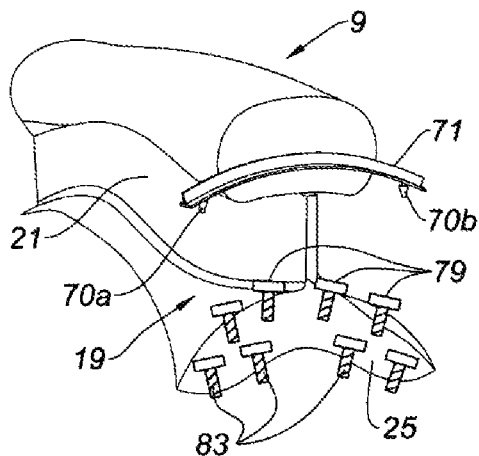

As shown in particular in FIGS. 13 and 14, it is advantageously possible to provide an additional row of bolts 83 able to connect the lower central wall 25 of the box-section 19 to the upstream part of the gas generator 5.

As shown in particular in FIG. 13, it is advantageously possible to provide trap doors 85, formed on the upper lateral walls 27a, 27b of the box-section 19, allowing access to the bolts 83.

The bolts 79 and 83 may advantageously be arranged in staggered rows, so as to optimize the distribution of the stresses between the faces 25 and 27a and 27b of the box-section part, as shown in FIG. 14.

Figure 15:
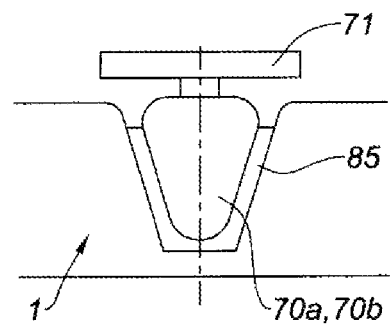
FIG. 15 is a diagrammatic view, in transverse cross-section relative to the axis of the turbojet engine, of the connecting means for connecting the strut of FIGS. 11 to 14 with the fan casing of the turbojet engine.

Preferably, and as shown in FIG. 15, which shows the cooperation zone of one of the cones 70a, 70b with the fan casing 1, one provides a flexible material 85 between the cones 70a, 70b and the fan casing 1: this on one hand allows better centering of the strut 9 relative to the casing 1 in case of misalignment of these two parts, and on the other hand a filtration of the vibrations of the turbojet engine T.

It will be noted that the cones 70a, 70b make it possible to recover the axial and lateral efforts of the turbojet engine T, without overloading the rear suspension of the strut 9. This makes it possible in particular to limit the bending moment induced in the casing of the gas generator 5 by the aerodynamic efforts applied to the air inlet in certain flight phases.

Figure 16:
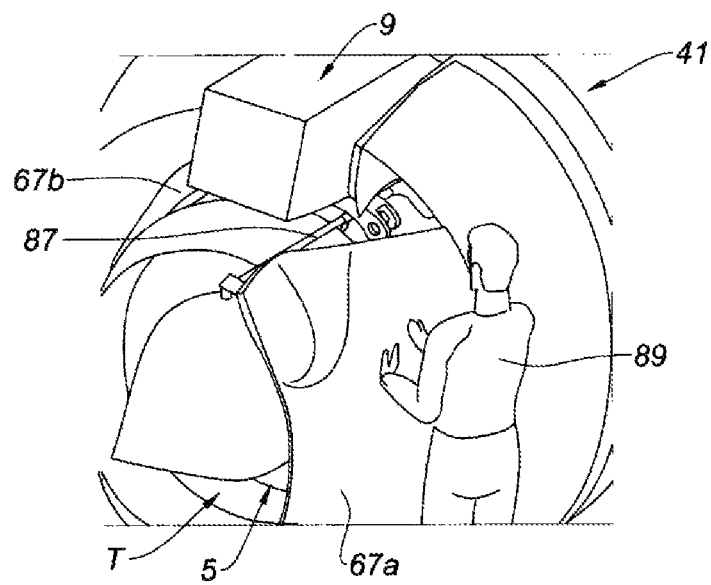
FIG. 16 is a perspective view of an operator in the process of opening the internal structure of a propulsion assembly according to the invention, comprising a thrust reverser of the type having doors.
Figure 17:
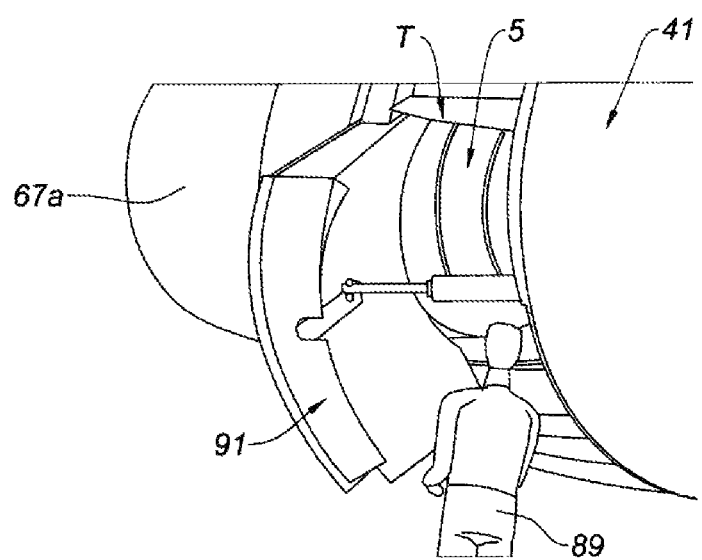
FIG. 17 is a perspective view of the operator in the process of accessing the turbojet engine of the propulsion assembly of FIG. 16 by the door of the reverser of that assembly.
Figure 18:
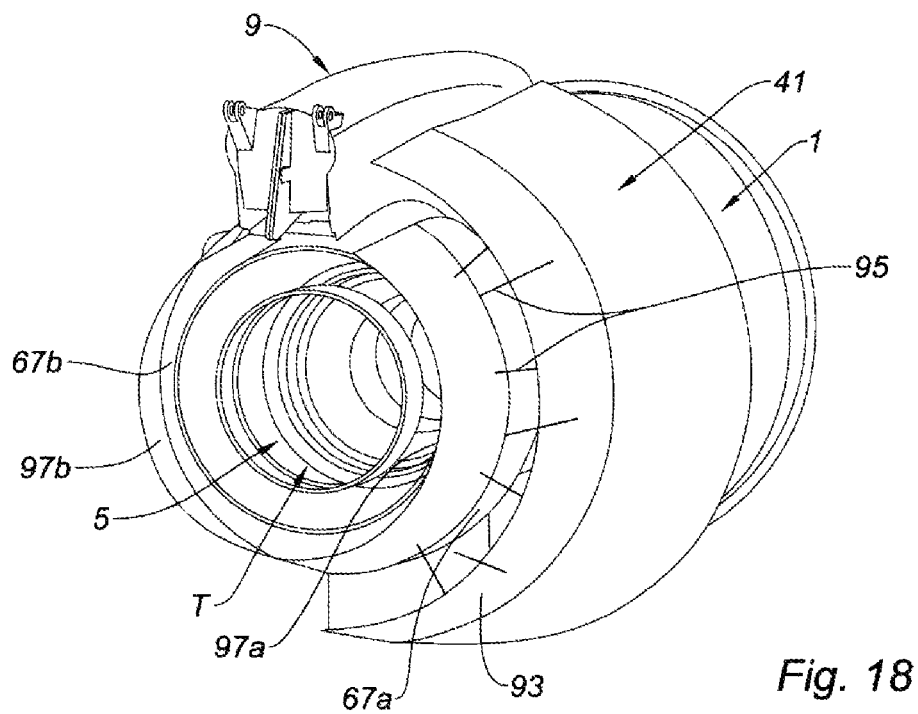
FIG. 18 is a perspective view of a propulsion assembly whereof the nacelle comprises a thrust reverser of another type, i.e. with cover doors situated on the trailing edge of the mobile reverser cowl.

These precepts could also be applied to a nacelle comprising a thrust reverser with doors, as shown in FIGS. 16 and 17.

In this case, and as shown in FIG. 16, the panel 67 as well as potentially the two half-panels 63a and 63b could be replaced by a single system with two independent left and right half-panels 67a and 67b, moving away from the front engine to withdraw owing to a set of connecting rods 87 and guideways as taught by French application Ser. No. 08/00501 filed by the applicant, the guideways in this case being able to be fixed to the box-section strut 9 according to the present invention.

Once the two half-panels 67a and 67b have been slid towards the back of the nacelle, as shown in FIG. 17, an operator 89 can access the gas generator 5 by passing through a door 91 of the reverser.

The thrust reverser could also be of the S-shaped secondary flow stream type, as taught for example by French application 06/04113.

In this case, the internal fixed structure of the nacelle could comprise two half-panels articulated on the strut 9 in the zone of the upper lateral walls 27a, 27b of the box-section part 19, and the assembly formed by the thrust reverser grids (and by their associated frames) and by the mobile cowl of the thrust reverser could take the form of two halves each slidingly mounted on a rail, itself pivotably mounted on the strut 9.

In this case, to access the gas generator 5, the mobile cowl half and the fixed structure half are successively opened, by pivoting around the strut 9 (as shown in FIG. 20).

In their lower parts, the two mobile cowl halves can be connected to each other directly by bolts, or can be slidingly mounted on two rails themselves connected to each other by bolts.

The thrust reverser could also be in compliance with French patent application Ser. Nos. 08/04295 and 07/07048 filed by the applicant: i.e. thrust reverser cover doors 93 are installed on the trailing edge of the mobile cowl, and actuated by connecting rods 95 connected to the internal fixed structure of the nacelle, due to the sliding of the mobile cowl.

Figure 19:
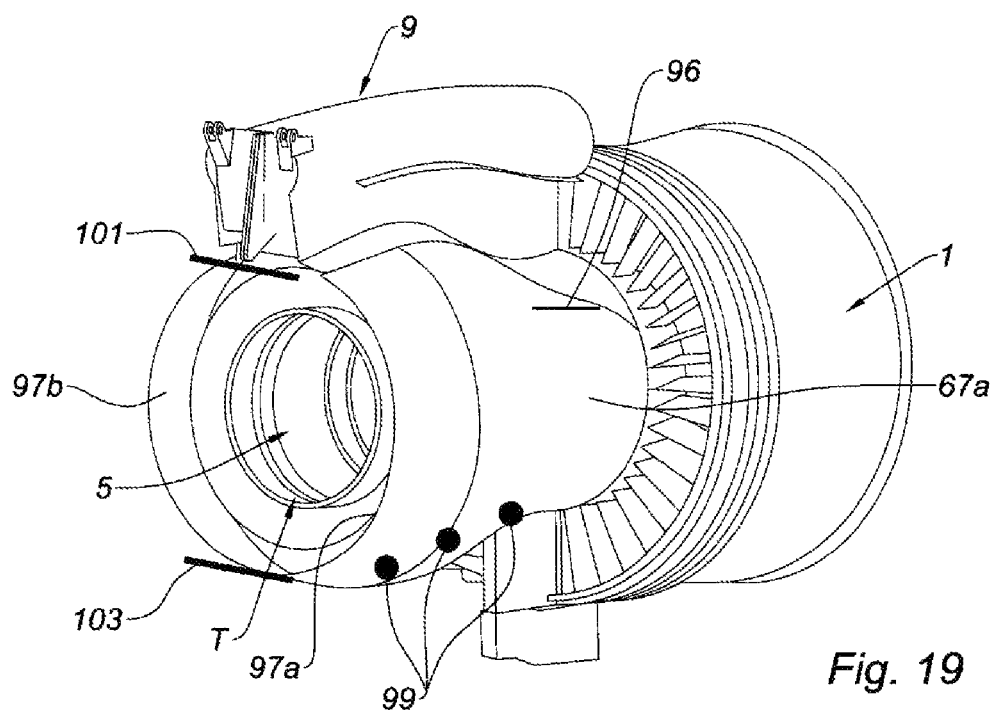
FIG. 19 is a perspective view of the assembly of FIG. 18, the mobile cowl having been removed for explanatory purposes.

More precisely, this internal structure can comprise two half-panels 67a, 67b articulated on the strut 9 as in the preceding case, each around an axis (one of which 96 is visible in FIG. 19), and an annular downstream part itself formed by two half-rings 97a, 97b.

Lower bolts 99 make it possible to connect the two half-panels 67a, 67b to each other.

Upper 101 and lower 103 bolts make it possible to connect the two half-rings 97a and 97b to each other.

The connecting parts connecting the two half-panels 67a, 67b with the upstream zone of the gas generator 5 are of the knives/spline type.

In the case one wishes for the downstream annular part 97a, 97b itself to contribute to the bending stiffness of the casing of the gas generator 5, it is possible to consider each of the two half-rings 97a, 97b also being connected to the gas generator 5 using means of the knife/spline type, or using any other suitable means (e.g. connecting rods).

FIG. 20 shows the two half-panels 67a, 67b in the opening position for maintenance, thereby freeing access to the gas generator 5.

FIGS. 21 and 22 show an operator 89 in the process of working on the gas generator 5, also making it possible to see the half-panel 67a and the mobile half-cowl 41a in the opening position.

As shown in these figures, the mobile half-cowl 41a (and its inverse, not shown) is slidingly mounted on a rail (not shown), itself pivotably mounted on the strut 9 (as indicated regarding the preceding embodiment).

It will be noted that, due to the connection of the half-ring 97*a* to the mobile half-cowl 41*a* via connecting rods 95, the opening of said mobile half-cowl results in driving that of said half-ring, thereby completely freeing access to the gas generator 5 for the operator 89.

It will be noted that, in all of the embodiments described above, the additional rigidity imparted to the internal fixed structure by the Y-shaped box-section part 19, as well as the girding done by the downstream annular part of said internal structure, grants additional bending stiffness to the casings of the gas generator 5 of the turbojet engine T, and allows better resistance of that internal structure relative to the pressure increase caused by a possible explosion of the pipes located at the periphery of the gas generator 5.

The precepts described in all of the preceding description could also be applied to a smooth nacelle, i.e. a nacelle not having a thrust reverser device.

The invention claimed is:

1. A strut adapted to support an aircraft turbojet engine nacelle, the strut comprising:
   a connecting part for connecting a casing of a fan or a casing of a gas generator of said turbojet engine and a wing of said aircraft, and
   a Y-shaped box-section part, secured to said connecting part and forming an upper part of an internal fixed structure of said nacelle, the Y-shaped box-section having a lower central wall connected to two upper lateral walls to define a hollow part without any internal stiffening members, the two upper lateral walls further defining platens to secure the Y-shaped box-section part to an upstream part of the gas generator,
   wherein the connecting part of the strut is fixed on said casing of the fan or on said casing of the gas generator, and thrust recovery connecting rods extending inside of the hollow part of the Y-shaped box-section part of said strut to cooperate with said casing of the gas generator.

2. The strut according to claim 1, wherein said Y-shaped box-section part comprises ventilation orifices.

3. The strut according to claim 1, wherein said connecting part comprises a cross-piece supporting connecting cones with said casing of the fan.

4. The aircraft turbojet engine nacelle incorporating the strut according to claim 3 in a downstream portion, not having thrust recovery connecting rods inside said Y-shaped box-section part.

5. The aircraft turbojet engine nacelle according to claim 1, wherein said downstream portion includes a grid thrust reverser.

6. The aircraft turbojet engine nacelle according to claim 5, wherein said reverser comprises a grid support structure comprising two upper halves fixed on said fan casing and connected to each other by connecting rods passing through the connecting part of said strut.

7. The aircraft turbojet engine nacelle according to claim 6, wherein said grid support structure also comprises two lower halves pivotably mounted on said upper halves between a service position and a maintenance position.

8. The aircraft turbojet engine nacelle according to claim 7, wherein said lower halves incorporate upstream panels defining the upstream lower part of the internal fixed structure of the nacelle, as a complement to said Y-shaped box-section part.

9. The aircraft turbojet engine nacelle according to claim 8, also comprising a quasi-annular panel defining the downstream lower part of the internal fixed structure of the nacelle, this panel being slidingly mounted on said Y-shaped box-section part between a service position in which it adjoins said upstream panels, and a maintenance position in which it is spaced away downstream from said upstream panels.

10. The aircraft turbojet engine nacelle according to claim 5, further comprising a cowl slidingly mounted on the connecting part of said strut between a direct jet position, in which said cowl covers said grids, and a reversed jet position, in which this cowl uncovers said grids.

11. The aircraft turbojet engine nacelle according to claim 10, wherein said cowl comprises two upper halves slidingly mounted on the connecting part of said strut, cooperating with at least two upper actuators, and a lower part slidingly mounted on said upper halves between an upstream service position and a downstream maintenance position.

12. The aircraft turbojet engine nacelle according to claim 11, comprising a lower actuator cooperating with said lower part.

13. The aircraft turbojet engine nacelle according to claim 11, comprising a frame connecting said two upper cowl halves to each other, and a lower actuator cooperating with said frame.

14. The aircraft turbojet engine nacelle according to claim 5, of a S-shaped secondary flow stream type, comprising two internal structure half-panels articulated on said strut and two mobile half-cowls slidingly mounted on rails themselves pivotably mounted on said strut.

15. The aircraft turbojet engine nacelle according to claim 5, comprising two half-panels and two half-rings defining an internal fixed structure of the nacelle, and two mobile half-cowls provided with thrust reverser cover doors on their trailing edges, connected by connecting rods to said half-rings, said half-panels being articulated on said strut, and the assemblies formed by said mobile half-cowls and by said half-rings being slidingly mounted on rails, themselves pivotably mounted on said strut.

16. The aircraft turbojet engine nacelle according to claim 1, comprising a thrust reverser with doors and the internal fixed structure comprising two half-panels, these two half-panels being able to move between a service position and a maintenance position using a system of connecting rods and guideways.

17. A propulsion assembly comprising the aircraft turbojet engine nacelle according to claim 1, and a turbojet engine housed inside said aircraft turbojet engine nacelle and cooperating with a part of said strut.

* * * * *